No. 714,915. Patented Dec. 2, 1902.
W. C. KEITHLY.
CAR BRAKE LEVER.
(Application filed Mar. 20, 1902.)

(No Model.)

Witnesses,

Inventor,
Willie C. Keithly
By Dewey Strong & Co
Attys

UNITED STATES PATENT OFFICE.

WILLIE C. KEITHLY, OF SAN FRANCISCO, CALIFORNIA, ASSIGNOR OF ONE-HALF TO L. H. BROWN, OF SAN FRANCISCO, CALIFORNIA.

CAR-BRAKE LEVER.

SPECIFICATION forming part of Letters Patent No. 714,915, dated December 2, 1902.

Application filed March 20, 1902. Serial No. 99,168. (No model.)

*To all whom it may concern:*

Be it known that I, WILLIE C. KEITHLY, a citizen of the United States, residing in the city and county of San Francisco, State of California, have invented an Improvement in Car-Brake Levers; and I hereby declare the following to be a full, clear, and exact description of the same.

My invention relates to an improved combination-lever which is especially designed for use upon street and like cars where hand-levers may be employed for the purpose of applying the brake.

It consists of horizontally-journaled parallel shafts located above the floor of the car, one of said shafts having a lever extending downwardly through the floor for the attachment of the brake-connecting rod, the other lever projecting upwardly and connected by a link with a rocker-arm attached to the second shaft and at such an angle with relation to the first lever that when the shaft is turned it acts to first give a rapid movement to the brake and connecting parts, and after the brake has been brought in contact with the wheels the movement of the lever is at such an angle as to provide for a slower movement with greatly-increased power to set the brake firmly. A hand-lever is connected with the second shaft, through which lever the movements are effected.

Figure 1:
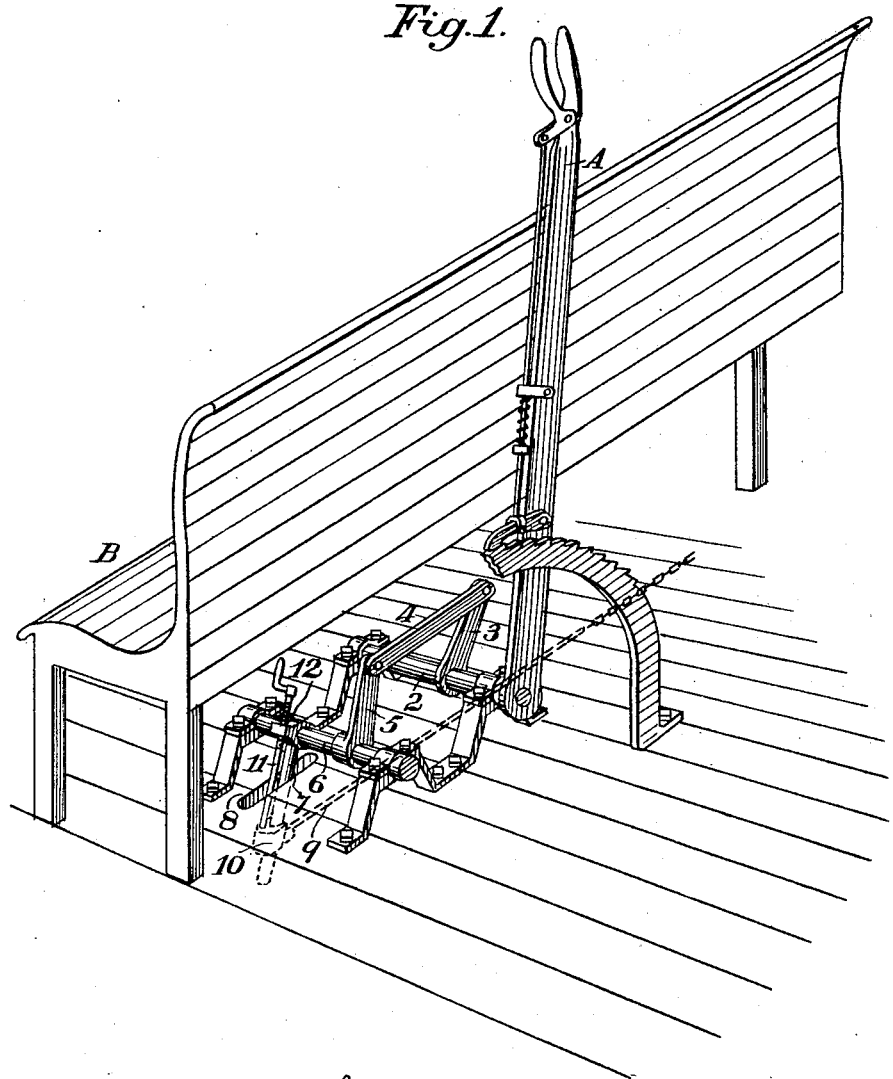
Figure 2:
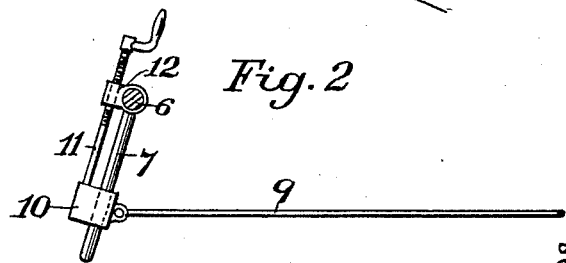

Referring to the accompanying drawings, Figure 1 is a perspective view of my invention as applied to a car. Fig. 2 is a side view of the rocker-arm 7.

The object of my invention is to provide an improved hand-lever apparatus which is especially designed for use upon street-cars where the brakes are applied through the action of a lever. These cars are very heavy, and the power necessary to properly apply the brakes at each regular and many emergency stops is very great and exhausting to the operator.

In my invention I have so combined the levers and rock-shafts as to provide for a rapid movement of the brake-shoe until it comes in contact with the wheel and then a gradual increase of power during the last movements of the actuating-lever.

I have here illustrated my invention as applied to street-cars having a central passage-way within which the motorman stands.

The long hand-lever A, through which power is applied, is fixed upon the end of a shaft 2, which is journaled in suitable supports close to one side of the passage-way, and one end of the shaft may extend beneath one of the side seats B, with which this class of cars are often equipped, so that the principal portion of the mechanism will be protected and out of the way beneath this seat. A rocker-arm 3 is fixed to this shaft between the lever A and the seat and extends upwardly in close proximity to the seat. This rocker-arm is connected by a link 4 with a second rocker-arm 5, which is fixed to a second horizontal shaft 6, journaled in like manner to the first shaft and also extending beneath the seat. A rocker-arm 7 extends from the lower part of the shaft 6 through a slot or opening 8 in the floor of the car, and beneath the car it has attached to it the rod 9, which extends to and connects with the brake-shoes or the lever mechanism, which is located beneath the cars and by which the brakes are actuated in the usual manner.

The especial value of my invention lies in the relative positions of the rocker-arms 3 and 5. Thus when the lever A and the rocker-arm 5, which are here shown as being in approximately parallel lines, are thrown forward and the brakes clear of the wheel the rocker-arm 3 will be but little out of a vertical line, while the rocker-arm 5 may be thrown forward at a very considerable angle. When by the action of the lever A the rocker-arm 5 is moved back, it acts through the link 4 to move the rocker-arm 3 with considerable rapidity and through an arc representing its longest throw or leverage from its shaft. As the rocker-arm 5 arrives at a more nearly vertical position the rocker-arm 3 will have assumed a more acute angle to the rear, and as the operative length of the arm 5 increases the distance of the link 4 from the shaft 2 is decreased by reason of the downward movement of the rocker-arm 3, which carries the link nearer to the shaft 2. This is practically equivalent to shortening the rocker-arm 3, and the power applied through the lever A is thus greatly increased at the instant when the brake-shoes having been applied to the wheels are to be forced against them with the greatest power. Thus a given power applied to the lever A will first move the rocker-arms 5 and 7 with considerable rapidity, because the rocker-arm 3 will be in such relative position with 5 that as said arm 3 moves through its arc it is temporarily farther from its fulcrum-shaft than is the rocker-arm 5 by reason of the acute angle of the latter. Therefore the pull through the link 4 will move the rocker-arm 5 and the arm 7 with more rapidity than the rocker-arm 3 during the first part of the movement, and as the rocker-arm 5 assumes a more nearly vertical position and the rocker-arm 3 a more acute rearward angle the link 4 is, as before stated, brought nearer to the fulcrum-shaft 2, and the result is the same as if the rocker-arm 3 had been shortened and the leverage correspondingly increased.

In order to increase or decrease the leverage and to in a measure compensate for wear of the brake-shoes, I fit a slide 10 to the lever-arm 7 beneath the car and connect the rod 9 with this slide. A screw-rod 11 extends up through a nut, as at 12, and the upper end has a suitable handle within reach of the motorman, so that by turning the screw the slide may be moved nearer to or farther from the fulcrum-shaft 6.

Having thus described my invention, what I claim, and desire to secure by Letters Patent, is—

1. The combination in a brake-lever mechanism, of parallel horizontal shafts, arms extending in opposite directions from one of said shafts and means connecting one of said arms with the brake, an arm projecting from the other shaft and means connecting this latter arm with the other arm of the first-named shaft, and a hand-lever substantially parallel with the arm of the second-named shaft.

2. A brake-actuating-lever mechanism consisting of a shaft, a car, above the floor of which said shaft is horizontally journaled, a hand-lever with holding rack and pawl mechanism fixed to said shaft, a rocker-arm extending upwardly from said shaft at an acute angle with the hand-lever, a second shaft journaled above the floor of the car parallel with the first-named shaft, having a rocker-arm substantially parallel with the hand-lever, a link connecting the two rocker-arms and maintaining them at divergent angles with each other, a lever extending from the second shaft downwardly through the floor of the car and a rod connecting said lever with the brake-actuating mechanism.

3. In a brake-lever mechanism, parallel horizontally-journaled shafts, a hand-lever and rocker-arm fixed to one shaft at an acute angle with each other, a rocker-arm fixed to the other shaft approximately parallel with the hand-lever, a link connecting the rocker-arms, a lever extending down from the second shaft, a slide with which the brake-rod is connected, and means by which the slide is movable to or from the fulcrum-shaft.

In witness whereof I have hereunto set my hand.

WILLIE C. KEITHLY.

Witnesses:
S. H. NOURSE,
JESSIE C. BRODIE.